Figure 1:
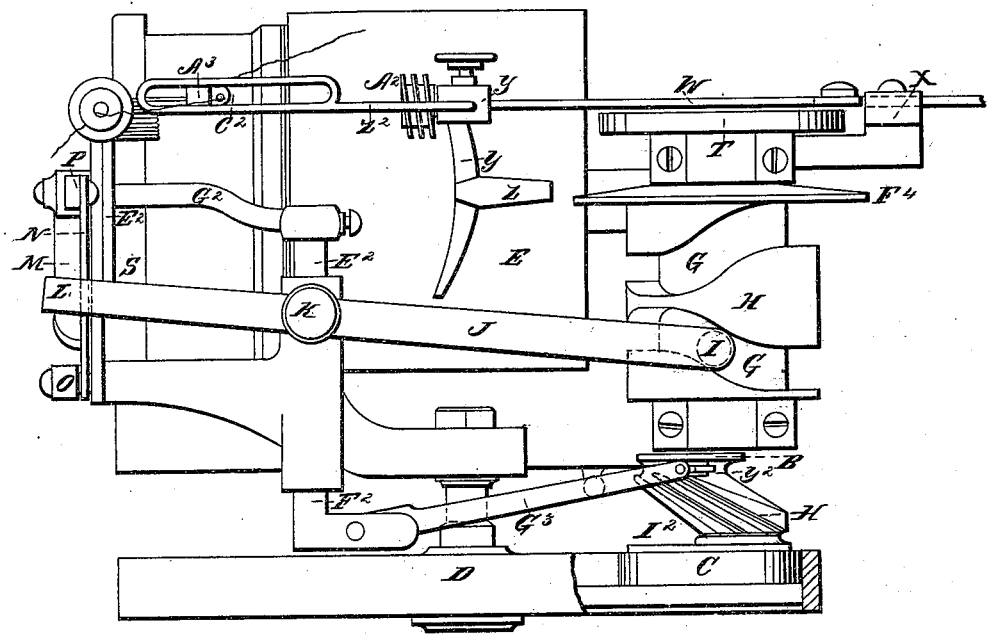
Figure 3:
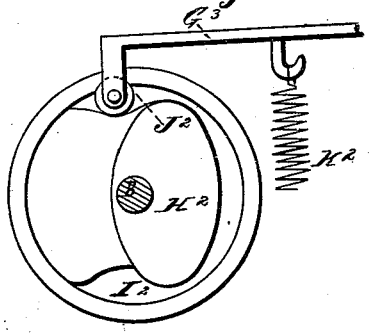

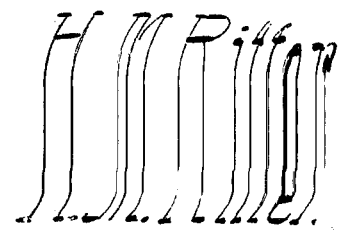
H. M. Ritter.
Knob Latch.
No. 64,571. Patented May 7, 1867.
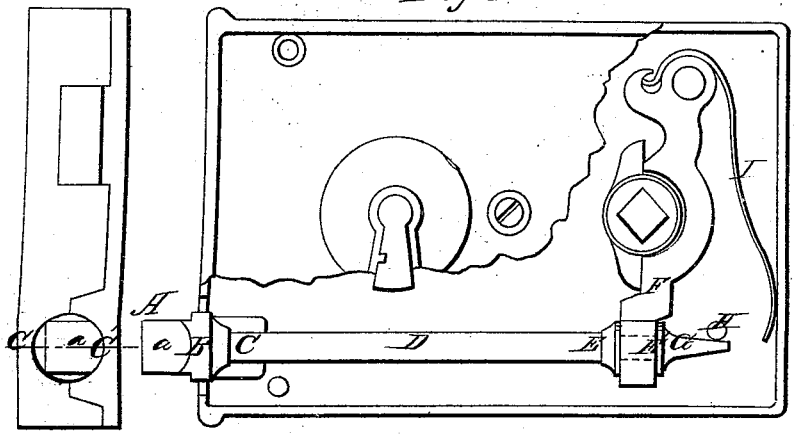
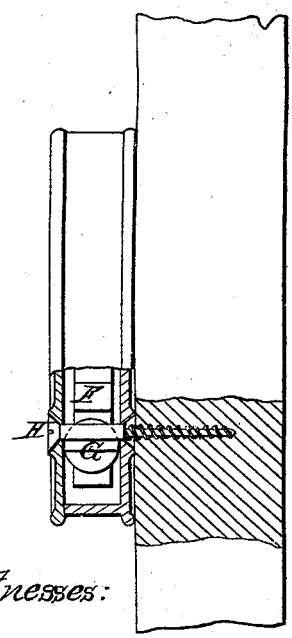
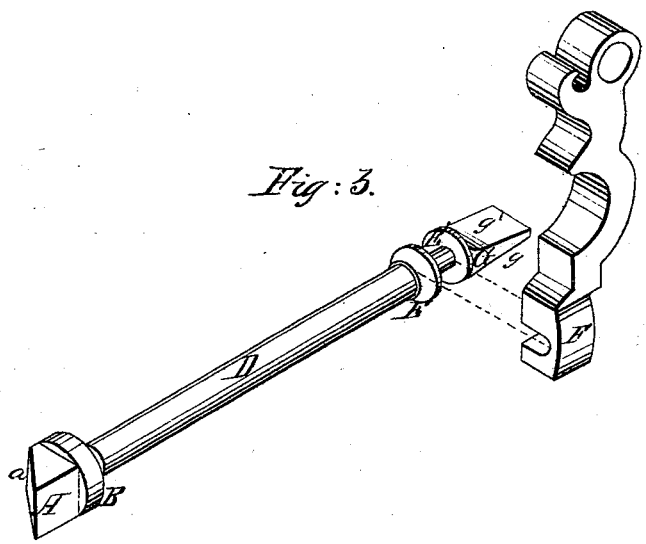
Witnesses:
J. H. Layman
H. G. Webber
Inventor:
Henry M. Ritter
By Knight Bros
Patent Attorneys M. L. Roberts.
Knitting Mach.

No. 64,572.    Patented May 7, 1867.

Witnesses
Theo Tusch
J. A. Service

Inventor:
M. L. Roberts.